Jan. 25, 1944.  B. A. YOUNG  2,339,970
LINE BLIND ASSEMBLY
Filed July 24, 1943  2 Sheets-Sheet 1

Inventor
Bernard A. Young
By James P. Burns
Attorney

Jan. 25, 1944.   B. A. YOUNG   2,339,970
LINE BLIND ASSEMBLY
Filed July 24, 1943   2 Sheets-Sheet 2

Inventor
Bernard A. Young
By James P. Burns
Attorney

Patented Jan. 25, 1944

2,339,970

UNITED STATES PATENT OFFICE 2,339,970

LINE BLIND ASSEMBLY

Bernard A. Young, Oakland, Calif.

Application July 24, 1943, Serial No. 496,091

4 Claims. (Cl. 251—167)

This invention relates to a novel line blind assembly particularly adapted for use in pipe lines to control the flow of fluids therethrough. Line blinds of the so-called spectacle type have heretofore been employed for controlling the flow of fluid through pipe lines, and it is the purpose of the present invention to provide a specific improvement in assemblies adapted for the employment of such spectacle blinds.

In the employment of spectacle line blinds, one end of the blind is provided with an aperture to permit flow of fluid through the piping system whereas the other end is solid so that when positioned in the pipe line, fluid flow is positively prevented.

The line blind is introduced into position and removed from position in the pipe line through a slot of limited circumferential extent. In line blind assemblies heretofore employed, difficulties have been encountered in insuring against leakage particularly in the area of the circumferential slot through which the blind is introduced to the pipe line. Additionally, difficulties have been encountered in freeing a line blind for removal to permit of the reversal of the spectacle blind either to effect closing of the pipe line or to provide for flow therethrough.

The present invention contemplates the provision of a simplified form of line blind assembly which overcomes the difficulties above noted and which additionally provides positive, effective and efficient means for insuring the release of the line blind when reversal of position thereof is desired.

It is therefore an object of the invention to provide a simplified line blind assembly which may be economically produced and which is highly effective in operation.

Further detailed objects and advantages of the invention will be made apparent from a consideration of the following description with reference to the accompanying drawings, in which.

Figure 1:
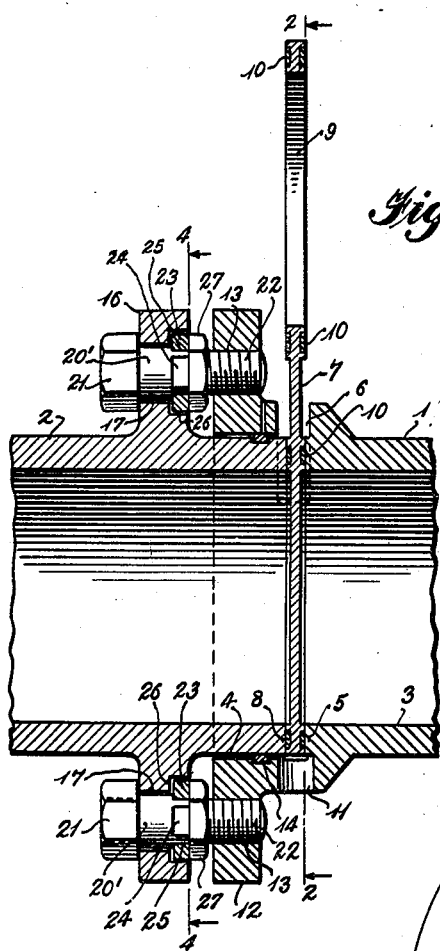
Figure 1 is a longitudinal cross-sectional view of the illustrative essential elements of the line blind assembly of the present invention.
Figure 2:
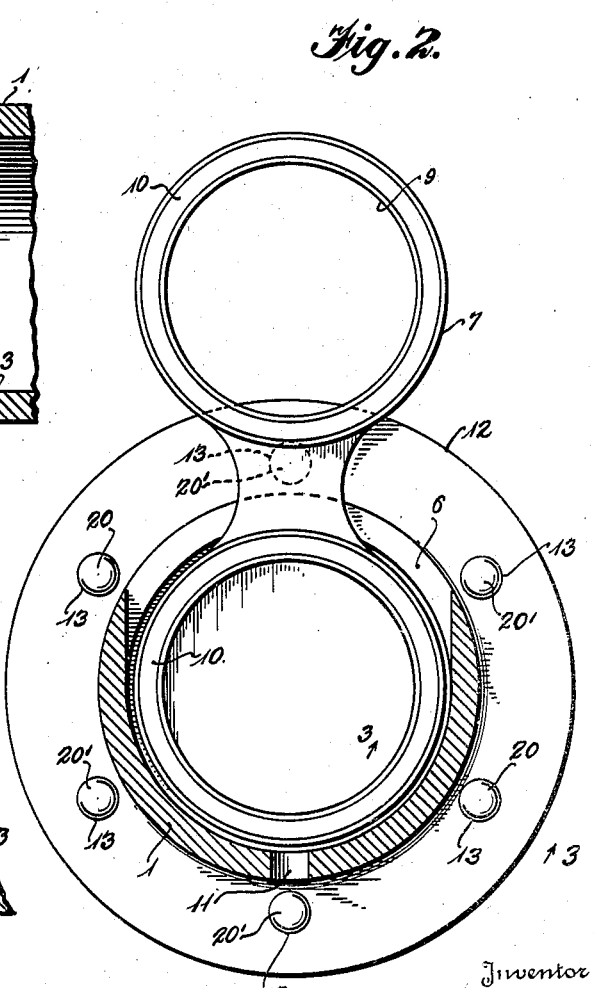
Figure 2 is a cross-sectional view of the assembly looking in the direction of line 2—2 of Fig. 1.

Referring to Fig. 1, the line blind assembly is illustrated as embracing a female section 1 adapted to be connected into a pipe line in any suitable manner (not shown) and a complementary male section 2 likewise adapted to be connected into a pipe line by means not shown. The female section 1 may be said to embrace a first portion 3 having an internal diameter approximately the same as the internal diameter of the male section 2, and a second portion 4 having an internal diameter slightly greater than the external diameter of the male section 2. The first portion 3 terminates in an annular shoulder 5 and the female section 1 is provided with a circumferential slot of limited extent 6 so positioned in respect to the shoulder 5 that a spectacle line blind such as 7, when inserted in the slot 6, will be adapted to bear against the shoulder 5. The free end 8 of the male section 2 is adapted to be received within the enlarged second portion 4 of the female section 1, in which position said free end 8 of the male section 2 is in axial alignment with the shoulder 5 carried at the end of the first portion 3 at the female section 1. The spectacle line blind 7 is thus adapted to be clamped between the annular shoulder 5 of the female section 1 and the annular face of the free end 8 of the male section 2. The spectacle blind 7 is provided with a solid face at one end and with an opening 9 at the opposite end. Thus, when in the position shown in Fig. 1, the pipe line is positively close to fluid flow, whereas, when the spectacle blind 7 is removed through the slot 6 and reversed, and the opening 9 brought into alignment with the sections 1 and 2, the pipe line may be opened to fluid flow. The line blind 7 is preferably provided with removable annular packing elements 10, which are so dimensioned as to face the annular shoulder 5 of female section 1 and the annular free end 8 of the section 2. The female section 1 may be provided with a suitable drain opening 11 immediately below the line blind 7 to the end that the annular space between the shoulder 5 of section 1 and the free end 8 of section 2 may be freed of any fluid upon insertion of the line blind 7 and thereby insure a tight seal between the blind 7 and the sections 1 and 2. The enlarged second portion 4 of the female section 1 in the form specifically shown in the drawings, carries a radially extending annular flange 12 provided with a series of circumferentially spaced openings 13. It is to be understood that where the assembly is employed in association with large pipe lines, the flange 12 may be dispensed with and the openings 13 provided in circumferentially spaced radially extending lugs. In the form shown, the openings 13 in the flange 12 of the female section 1 are threaded to receive clamping and jack screws. To facilitate relative movement between the male section 2 and the enlarged second portion 4 of the female section 1, the interior face of the enlarged portion 4 may advantageously carry a lubricated packing gland 14, a small opening for increasing lubricant being provided at 15.

The male section 2 in the form specifically illustrated in the drawings is also provided with an annular flange 16 provided with spaced circumferential openings 17 (Fig. 4) as in the case of the flange 12, the flange 16 may, in larger dimensioned assemblies, be replaced by a series of circumferentially spaced lugs. The openings 17 in the flange 16 are adapted to be axially aligned with the threaded openings 13 in the flange 12.

Figure 3:
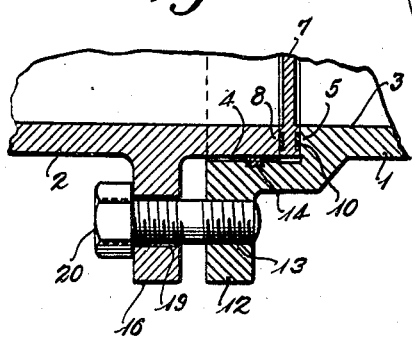
Figure 3 is a detail view showing a conventional clamping bolt construction.

To insure the effective clamping of the line blind 7 in position in the line blind assembly and for releasing the same for removal and reversal, there is provided a series of jack screws adapted to be received in predetermined selective sets of pairs of aligned openings 13 and 17. It is not usually necessary to provide jack screws in all of the circumferentially spaced aligned pairs of openings 13 and 17 since a single pair of diametrically opposed jack screws may be effective to jack the sections 1 and 2 of the assembly apart to permit of easy and ready removal of the line blind 7. In larger pipe line assemblies, however, two or more sets of diametrically opposed jack screws are preferably employed. This arrangement permits of the use of less expensive clamping screws at intermediate points, as indicated, for example, at 18 and 19 in Fig. 4. In these locations, a conventional clamping screw such as shown at 20 in Fig. 3 may be employed.

Figure 4:
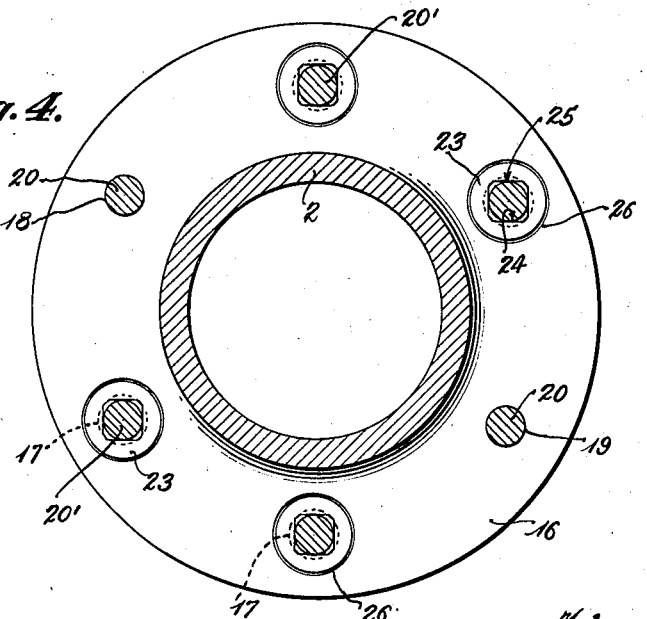
Figure 4 is a cross-sectional view of the line blind assembly looking in the direction of the line 4—4 of Fig. 1.
Figure 5:
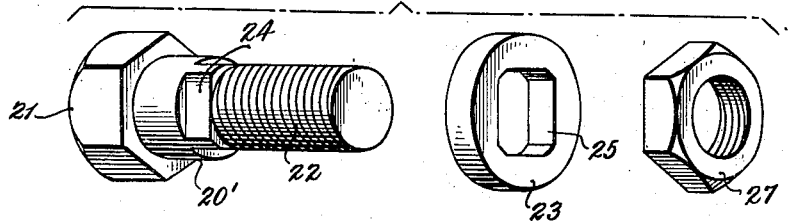
Figure 5 is an exploded view of one form of jack screw construction adapted for use in the line blind assembly.

One advantageous form of jack screw construction suitable for use in diametrically opposed positions, as illustrated in Fig. 4, is shown in the exploded view of Fig. 5. In this form, the jack screw 20 is headed at one end as at 21 and threaded at the opposite end as at 22. A spacing washer 23 is adapted to be received on the jack screw 20 and held against rotation thereon by the interaction of the square faces 24 and 25. The openings 17 in the flange 16 of the male section 2 may be advantageously recessed, as shown at 26, to receive the spacing washer 23. The washer 23 is held in assembled position on the jack screw 20 by the half nut 27. This construction of jack screw permits of ready assembly even with the sections 1 and 2 in telescopic arrangement substantially as shown in Fig. 1 since the washer 23 may be inserted in the space between the flanges 12 and 16 and the free end of the jack screw 20 passed therethrough, the half nut being threaded into position to hold the washer 23 in abutting relation to the flange 16. By providing the recess 26 to receive the washer 23, greater space is made available for effecting this assembly.

When it is desired to clamp the line blind 7 in position in the assembly, the threaded ends 22 of the jack screws 20 are threaded into the openings 13 of the flange 12 and the male section 2 drawn into the free end of the female section 1, thus forcefully clamping the blind 7 between the shoulder 5 of the female section 1 and the free end 8 of the male section 2. When it is desired to jack the sections 1 and 2 slightly apart to permit of ready removal of line blind 7 through the slot 6, all of the jack screws and clamping screws are initially loosened. It is desirable that the recesses 26 in the flange 16 be of sufficient depth to permit an initial slacking away of the jack screws 20. When this is done, further rotation of diametrically opposed jack screws will very effectively jack the male section 2 and the female section 1 apart, widening the space between the shoulder 5 of section 1 and the free end 8 of section 2 to permit ready and easy removal of the blind 7. Upon reinsertion of the blind 7, the jack screws are again rotated in a direction to effect a clamping action to seal the line blind between the shoulder 5 of section 1 and the free end 8 of section 2.

Figure 6:
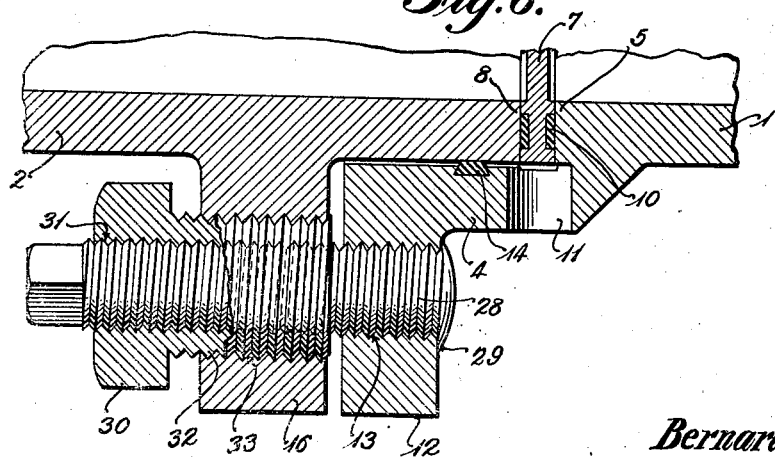
Figure 6 is a detail fragmentary view illustrating an alternative form of jack screw construction.

Referring to Fig. 6, a modified jack screw construction is disclosed for use in drawing the sections 1 and 2 toward each other and for jacking them apart to free the line blind for removal and reversal of position. In this case, the screw 28 is threadedly received in the opening 13 in the flange carried by the enlarged portion 4 of the female section 1 and is then peened over as indicated at 29 to secure the same in relation to the flange 12. A differentially threaded nut 30 having internal threads 31 and external threads 32 is adapted to be received on the threaded shank of the screw or bolt 28. The threads 32 of the differentially threaded nut 30 engage in complementary threads 33 in the openings 18 of the flange 16. In the form shown in Fig. 6, both the interior threads 31 and the exterior threads 32 of the differentially threaded nut are left-hand threads. The arrangement is such that the differential threads effect a relative push and pull action; that is, the flange 12 is pulled toward the flange 16, and at the same time the flange 16 is pushed toward the flange 12, the reverse operation being true upon a reverse rotation of the differentially threaded nut 30. The differentially threaded nut 30 of Fig. 6 may be made to exert an enormous amount of tension since the travel of the flanges 12 and 16 to and from each other may be made very small for a complete turn of the nut 30. This modification therefore provides a very effective means for clamping the sections 1 and 2 against the line blind 7 and for jacking said sections apart to permit release of the line blind.

In all of the forms and modifications of the invention, it will be observed that provision is always made for the location of a clamping jack screw in axial alignment with the circumferential slot 6. In the prior art practice, the line blind has usually been inserted at a point intermediate the clamping flanges carried by the pipe section, making it impossible to position a clamping screw in axial alignment with the slot through which the line blind is introduced. In fact, in such constructions, clamping screws may thus be spaced apart a distance equal to the overall length of the circumferential slot. This spacing in larger dimensioned pipe lines has been found objectionable, and this difficulty is completely overcome by the combination of elements embraced in the instant invention.

From the foregoing it will be apparent that the present invention embraces a simplified and meritorius line blind assembly, and it is desired that it be understood that the disclosure herein given is by way of exemplification and not in limitation of the invention which is comprehended by the subjoined claims.

Having thus described the invention, what is claimed as new and desired to be secured by Letters Patent is:

1. In combination a line blind assembly comprising a female section, a male section received in said female section, said female section having a first portion with an internal diameter substantially the same as the internal diameter of the male section, and a second portion extending beyond said first portion with an internal diameter slightly greater than the external diameter of said male section, a line blind receiving slot remote from the free end of said female section and so positioned that a line blind inserted through said slot will bear against the end of said first portion of said female member, means projecting radially from the periphery of said second portion of said female member intermediate said slot and the free end of said female member, means projecting radially from said male section, pairs of aligned openings in said radially extending means spaced circumferentially around said assembly, at least one of said pairs of aligned openings being located in axial alignment with said slot, jack screws positioned in certain of said pairs of openings, means for threadedly receiving each jack screw in one of the aligned openings of each pair, and means associated with each of said jack screws for positively jacking said male and female members apart to free a line blind for removal through said slot.

2. In combination a line blind assembly comprising a female section, a male section received in said female section, said female section having a first portion with an internal diameter substantially the same as the internal diameter of the male section, and a second portion extending beyond said first portion with an internal diameter slightly greater than the external diameter of said male section, a line blind receiving slot remote from the free end of said female section and so positioned that a line blind inserted through said slot will bear against the end of said first portion of said female member, means projecting radially from the periphery of said second portion of said female member intermediate said slot and the free end of said female member, means projecting radially from said male section, pairs of aligned openings in said radially extending means spaced circumferentially around said assembly, at least one of said pairs of aligned openings being located in axial alignment with said slot, jack screws positioned in certain of said pairs of openings, means for threadedly receiving each jack screw in one of the aligned openings of each pair, and means removably carried by each of said jack screws for positively jacking said male and female members apart to free a line blind for removal through said slot.

3. In combination a line blind assembly comprising a female section, a male section received in said female section, said female section having a first portion with an internal diameter substantially the same as the internal diameter of the male section, and a second portion extending beyond said first portion with an internal diameter slightly greater than the external diameter of said male section, a line blind receiving slot remote from the free end of said female section and so positioned that a line blind inserted through said slot will bear against the end of said first portion of said female member, means projecting radially from the periphery of said second portion of said female member intermediate said slot and the free end of said female member, means projecting radially from said male section, pairs of aligned openings in said radially extending means spaced circumferentially around said assembly, at least one of said pairs of aligned openings being located in axial alignment with said slot, jack screws positioned in certain of said pairs of openings, means for threadedly receiving each jack screw in one of the aligned openings of each pair, and a spacing collar and lock nut carried by each of said jack screws for positively jacking said male and female members apart to free a line blind for removal through said slot.

4. In combination a line blind assembly comprising a female section, a male section received in said female section, said female section having a first portion with an internal diameter substantially the same as the internal diameter of the male section, and a second portion extending beyond said first portion with an internal diameter slightly greater than the external diameter of said male section, a line blind receiving slot remote from the free end of said female section and so positioned that a line blind inserted through said slot will bear against the end of said first portion of said female member, means projecting radially from the periphery of said second portion of said female member intermediate said slot and the free end of said female member, means projecting radially from said male section, pairs of aligned openings in said radially extending means spaced circumferentially around said assembly, at least one of said pairs of aligned openings being located in axial alignment with said slot, jack screws positioned in certain of said pairs of openings, means for threadedly receiving each jack screw in one of the aligned opening of each pair, and a differentially threaded nut carried by each of said jack screws for positively jacking said male and female members apart to free a line blind for removal through said slot.

BERNARD A. YOUNG.